United States Patent
Ansey

(10) Patent No.: US 6,815,089 B2
(45) Date of Patent: Nov. 9, 2004

(54) STRUCTURAL COMPONENTS FOR THE BOILER ZONE OF POWER PLANTS OR REFUSE INCINERATION PLANTS

(75) Inventor: Johann Wilhelm Ansey, Hamburg (DE)

(73) Assignee: BBP Service GmbH (DE)

( * ) Notice: Subject to any disclaimer, the term of this patent is extended or adjusted under 35 U.S.C. 154(b) by 0 days.

(21) Appl. No.: 10/468,593

(22) PCT Filed: Feb. 15, 2002

(86) PCT No.: PCT/EP02/01623

§ 371 (c)(1),
(2), (4) Date: Aug. 20, 2003

(87) PCT Pub. No.: WO02/068863

PCT Pub. Date: Sep. 6, 2002

(65) Prior Publication Data

US 2004/0076850 A1 Apr. 22, 2004

(30) Foreign Application Priority Data

Feb. 26, 2001 (DE) ......................... 101 09 138

(51) Int. Cl.[7] .......................... B32B 15/18; F22B 37/00; C25D 5/12; C25D 7/00
(52) U.S. Cl. ....................... 428/685; 428/679; 428/680; 428/935; 588/900
(58) Field of Search ................................ 428/685, 679, 428/680, 935; 588/900

(56) References Cited

U.S. PATENT DOCUMENTS

| | | | | |
|---|---|---|---|---|
| 3,645,861 A | * | 2/1972 | Garvey ....................... | 205/170 |
| 4,116,629 A | * | 9/1978 | Gancy et al. ................. | 422/13 |
| 4,351,713 A | * | 9/1982 | Hirt et al. .................... | 204/207 |
| 4,696,724 A | * | 9/1987 | Deguchi et al. ............ | 205/197 |
| 4,758,479 A | * | 7/1988 | Swathirajan et al. ........ | 428/659 |
| 4,795,503 A | * | 1/1989 | Takahashi et al. ........... | 148/518 |
| 5,083,002 A | * | 1/1992 | Hoback et al. ............... | 219/74 |
| 5,259,547 A | * | 11/1993 | Hardwick .................... | 228/107 |
| 5,376,464 A | * | 12/1994 | Dupoiron et al. ........... | 428/679 |
| 5,422,192 A | * | 6/1995 | Takahashi et al. .......... | 428/632 |

FOREIGN PATENT DOCUMENTS

| | | | |
|---|---|---|---|
| EP | 819775 | * | 1/1998 |
| EP | 928658 | * | 7/1999 |
| WO | 97/43457 | * | 11/1997 |

* cited by examiner

Primary Examiner—John J. Zimmerman
Assistant Examiner—Jason Savage
(74) Attorney, Agent, or Firm—R W Becker & Associates; Robert W. Becker

(57) ABSTRACT

The invention relates to structural components for the boiler zone of power plants or refuse incineration plants, especially tubes or nests of tubes, fin and diaphragm walls, that consist of steel or steel alloys, and is characterized by a continuous closed outer nickel or nickel alloy layer galvanically deposited having a layer thickness of approximately 1 to 5 mm, preferably 1 to 2.5 mm.

6 Claims, No Drawings

STRUCTURAL COMPONENTS FOR THE BOILER ZONE OF POWER PLANTS OR REFUSE INCINERATION PLANTS

BACKGROUND OF THE INVENTION

The invention relates to components for the boiler area of power stations or refuse incineration plants inclusive of special waste incineration plants, as well as such plants in which corrosive, abrasive loading or the like can lead to premature damage.

Since combustion equipment such as power stations or refuse incineration plants fulfill the purpose always only in conjunction with upstream or downstream equipment such as conveyors, heat exploitation and flue gas washing installations, the operational readiness of all individual components is decisive for overall availability. In the case of combustion of solid fuels or solid industrial or special wastes as well as domestic refuse, plants of that kind usually consist of delivery systems for the solid fuels, a furnace in the form of a drum furnace or shaft furnace, optionally with an afterburning chamber, a steam boiler for waste heat utilization, a flue gas washer and the chimney. The combustion temperatures in the furnace lie between about 800 to 1200° C. for a dwell time of up to one hour for the combustion material. The arising flue gases have to be cooled from the combustion chamber by way of the boiler flues towards the dust extraction installations, wherein the continuous temperature difference can be up to 800° C. Since flue gas as raw gas can contain up to more than 10,000 $mg/m^3$ of dust in the raw gas and always still up to 100 $mg/m^3$ of dust in the clean gas, a deposit of these flue gas constituents at the water-conducting or steam-conducting heat carrier system, such as pipes, pipe bundles, finned walls, etc., in the average temperature range cannot be avoided. The dust components bake into stone-like coatings on the components of steel or steel alloys, which on the one hand obstructs heat transfer and on the other hand very strongly promotes corrosion, since HCl and other substances contained in the flue gas are also contained in the coatings and there lead to chloride corrosion of the steel. Apart from the chemical attack by corrosion, there is also, however, a mechanical attack by abrasion through the dust particles contained in the flue gas, wherein abrasive wear can also come about with, for example, the threat of rust by the combustion material itself.

Components such as pipes or pipe bundles therefore have to be regularly demounted and replaced, due to abrasive or corrosive wear, in boiler areas in power stations or refuse incineration plants, which generally means temporary stoppage of the entire plant and which causes annual costs for each plant in the order of magnitude of several hundreds of thousands of Deutsch Marks, in conjunction with an uncoordinated availability. It has already been attempted to deal with this problem by the use of other materials such as, for example, new forms of nickel alloys; thus, EP 0 819 775 describes a nickel-chromium-iron alloy with a reduced content of niobium, which shall have good corrosion resistance and workability. There is known from EP 0 928 658 an Ni—Cr—Mo—Fe alloy which can be welded to a metal support. This alloy, too, shall have a higher corrosion resistance than the usual alloys. A further Ni—Cr—Co alloy with increased corrosion resistance is described in PCT application WO 97/43457. For the repair of metal pipes with wear locations, EP 0 729 522 describes application, by electroplating, to the inner wall of such a pipe of commercially available alloys based on, for example, nickel, chromium, copper or iron. Wear locations in pipes with a typical diameter between 10 to 50 mm can be repaired in this manner, wherein the repair locations can be approximately 5 to 900 mm long. In addition, the repair alloy applied by electroplating must satisfy specific conditions with respect to layer thickness and compound crystal limits. Moreover, there are known from PCT application WO 98/09751 pipes for incineration plants which consist of an inner pipe component of specific steel alloys and an outer component of a special Ni—Cr—Mo—Nb—Fe alloy, wherein the two components are combined by way of a metallurgical bond, particularly by the Osprey method.

The special alloys proposed in the publications are comparatively expensive, so that they are hardly used in practice. Only the resurfacing weld method also described in, for example, EP 0 729 522, which is also termed "cladding", has found some applications in practice, but it has proved that the service lives can be improved in the hoped-for degree only to a limited extent, and moreover a welding of elbows and straight pipes is required.

There therefore still exists a need for components for the boiler area of power stations or refuse incineration plants and the like which have a significantly higher resistance against corrosive or abrasive wear and can be produced in a production process without additional weld seams.

SUMMARY OF THE INVENTION

For solution of the task there are proposed components for the boiler area of power stations or refuse incineration plants, particularly pipes and pipe bundles, made of steel or steel alloys, which are characterized by a continuous outer electroplated layer of nickel or nickel alloys with a layer thickness of approximately 1 to 5 mm, preferably 1 to 2.5 mm.

Quite unexpectedly it has now been established that a continuous external electroplated layer of pure nickel or nickel alloys, particularly Ni—Co alloys, with a relatively small layer thickness of approximately 1 to 2.5 mm suffices to multiply the service lives of such components. Such a nickel coating applied by electroplating obviously prevents not only abrasive wear in all temperature ranges, but quite unexpectedly the deposition of airborne particles of dust on the components and consequent chloride corrosion are thereby largely prevented in the average temperature range. Tests in a refuse incineration plant have shown that the rate of erosion in the case of pipes treated in accordance with the invention was virtually equivalent to zero by comparison with unprotected pipes, which in the same period of use at the same location exhibit an erosion of up to 1.5 mm within a quarter of a year. Since hardly any dust particles had settled on the surface of the pipes, a significantly reduced expenditure on cleaning can also be expected in the future.

Nickel-plating belongs to the oldest method of electroplating technology and has been used in different variants for a long time. The component of steel or steel alloys to be electroplated is in that case connected as a cathode; electrolyte nickel is not usually used as the anode material for nickel-plating, since due to passivation this would dissolve only in certain electrolytes. Processing is normally with a mixture of nickel sulfate and small quantities of nickel chloride as well as boric acid or citric acid. The methods used are state of the art and known to one skilled in the art.

The outer coating applied by electroplating can comprise pure nickel or also—according to the respective temperature requirement and other environmental requirements—nickel alloys; where, for example, there is a threat of rust, the use of an Ni—Co alloy is preferred due to its greater wear resistance. Similarly, Ni—Mo, Ni—P or alloys with a specific content of rare earth metals can also be used for specific purposes.

The nickel-plating can be undertaken not only on pipes and pipe bundles, but also on other plant components such as serpentine heating pipes, finned walls, diaphragm walls, etc.

Nickel-plating is a method enabling a largely stress-free coating. It is even possible, if required, to connect plant components by welding without in that case damaging the nickel-plating.

The particular advantage of the invention resides above all in the fact that the service lives of the loaded components in the boiler area can be multiplied and thereby the otherwise inevitable shutdowns are similarly significantly reduced and standstill periods can be planned. A direct statement still cannot be made about the level of cost reduction such as in the case of a 320,000 ton plant like, for example, the Rugenberger Dam with two boilers (each boiler 160,000 tons), since empirically established values for that are lacking.

However, it can be assumed that the increased cost due to nickel-plating would already be amortized after two years. A service life improvement of at least 8 to 10 years is calculated.

Beyond that it has been shown in tests that the advantageous components have a further effect which is manifested in that the components remain free especially from the particles which otherwise usually settle or these particles substantially no longer adhere to the components. In technical terms the special effect achieved is also denoted by the so-called lotus flower effect.

Moreover it has proved that with the preferred form of special coating the efficiency of a power station or a refuse incineration plant can be decisively enhanced by the improved thermal transfer in consequence of components which are kept clean. In addition, due to the improved efficiency the overall heat output can be decreased and thus the exhaust of environmentally harmful $CO_2$ gas significantly reduced.

What is claimed is:

1. Components for the boiler area of power stations or refuse incineration plants, wherein said components are made of steel or steel alloys, and have a single continuous, closed, outer electroplated layer of nickel or nickel alloys, and wherein said layer has a thickness of approximately 1 to 5 mm.

2. Components according to claim 1, wherein said components are selected from the group consisting of pipes, pipe bundles, finned walls and diaphragm walls.

3. Components according to claim 1, wherein said layer has a thickness of from 1 to 2.5 mm.

4. Components for gas conduction according to claim 1, wherein said outer layer comprises a Ni—Co alloys or Ni—Mo alloy.

5. Components for gas conduction accord to claim 1, wherein said outer layer comprises Ni—P alloys or Ni—Si-metal alloys.

6. Components for gas conduction according to claim 1, wherein said layer has a thickness of approximately 1.5 mm.

* * * * *